(12) United States Patent
Finck

(10) Patent No.: US 9,079,715 B2
(45) Date of Patent: Jul. 14, 2015

(54) LIFTING DEVICE WITH SUCKER MOUNT ARRANGEMENT AND UPWARDLY CURVED HANDLE

(71) Applicant: Belron Hungary Kft-Zug Branch, Zug (CH)

(72) Inventor: William Finck, Brentwood (GB)

(73) Assignee: BELRON HUNGARY KFT—ZUG BRANCH, Zug (CH)

( * ) Notice: Subject to any disclaimer, the term of this patent is extended or adjusted under 35 U.S.C. 154(b) by 0 days.

(21) Appl. No.: 13/897,727

(22) Filed: May 20, 2013

(65) Prior Publication Data

US 2013/0277990 A1    Oct. 24, 2013

Related U.S. Application Data

(62) Division of application No. 13/318,495, filed as application No. PCT/GB2010/000885 on May 5, 2010, now Pat. No. 8,444,193.

(30) Foreign Application Priority Data

May 6, 2009 (GB) .................................. 0907781.9

(51) Int. Cl.
*B66C 1/02* (2006.01)
*B65G 7/12* (2006.01)
*B25B 11/00* (2006.01)
*B65G 49/06* (2006.01)

(52) U.S. Cl.
CPC ................ *B65G 7/12* (2013.01); *B25B 11/007* (2013.01); *B65G 49/061* (2013.01); *B65G 2249/04* (2013.01)

(58) Field of Classification Search
USPC ............... 294/15, 187, 16, 183, 186, 189, 65; 248/205.5, 206.3, 206.4, 206.5, 363; D8/14, 316; 29/468, 559
See application file for complete search history.

(56) References Cited

U.S. PATENT DOCUMENTS

| 2,127,154 | A |   | 8/1938  | Burk    |         |
|-----------|---|---|---------|---------|---------|
| 2,131,687 | A | * | 9/1938  | Kaplan  | 294/187 |
| 2,212,755 | A |   | 8/1940  | Solomon |         |
| 2,287,576 | A |   | 6/1942  | Solomon |         |
| 2,303,393 | A | * | 12/1942 | Schmidt | 294/186 |
| 2,523,157 | A |   | 9/1950  | Somma   |         |
| 2,871,054 | A |   | 1/1959  | Zinki   |         |
| 3,061,351 | A |   | 10/1962 | Johnson |         |
| 3,219,377 | A | * | 11/1965 | Benigene| 294/187 |
| 3,831,991 | A | * | 8/1974  | Lukeman | 294/187 |
| 3,913,964 | A | * | 10/1975 | Lukeman | 294/187 |

(Continued)

FOREIGN PATENT DOCUMENTS

| DE | 20103755 U1     | 3/2001 |
| WO | WO9912840       | 3/1999 |
| WO | WO2007039738 A1 | 4/2007 |

*Primary Examiner* — Paul T Chin
(74) *Attorney, Agent, or Firm* — Gordon & Jacobson, PC

(57) ABSTRACT

A lifting device has an elongate lifting arm provided with a suction mount enabling securing of the device to a body to be lifted. The suction mount has suction devices spaced apart in the longitudinal direction of the lifting arm sufficiently for a user to grip the lifting arm in between the suction mount devices. The device extends away from the suction mount, in the longitudinal direction of the lifting arm, to a handle spaced from the suction mount, and which extends upwardly above the lifting arm on the opposite side of the lifting arm to the suction mount devices.

14 Claims, 5 Drawing Sheets

(56) References Cited

U.S. PATENT DOCUMENTS

| | | | |
|---|---|---|---|
| 4,612,661 A * | 9/1986 | Dallas | 378/77 |
| 4,932,701 A | 6/1990 | Cornillier et al. | |
| 5,265,921 A * | 11/1993 | Nikitas et al. | 292/145 |
| 5,707,094 A | 1/1998 | Gower | |
| 5,715,876 A * | 2/1998 | Burt | 141/86 |
| 5,772,823 A * | 6/1998 | Rusch et al. | 294/187 |
| D459,958 S * | 7/2002 | Smith | D8/14 |
| 7,004,521 B2 * | 2/2006 | Ishii | 294/187 |
| 7,216,411 B1 | 5/2007 | Mayhugh | |
| 7,322,092 B2 * | 1/2008 | Adas et al. | 29/468 |
| D567,619 S | 4/2008 | Rianda | |
| 8,104,809 B1 | 1/2012 | Mayhugh | |
| 8,444,193 B2 * | 5/2013 | Finck | 294/187 |
| 2002/0100899 A1 * | 8/2002 | Kazerooni | 254/266 |
| 2003/0201369 A1 * | 10/2003 | Dretzka | 248/206.2 |
| 2006/0156533 A1 | 7/2006 | Mayhugh | |
| 2007/0216177 A1 * | 9/2007 | Liao | 294/64.1 |

* cited by examiner

LIFTING DEVICE WITH SUCKER MOUNT ARRANGEMENT AND UPWARDLY CURVED HANDLE

CROSS-REFERENCE TO RELATED APPLICATIONS

This application is a divisional of U.S. Ser. No. 13/318,495, having a 371(c) date of Jan. 12, 2012, which claims priority from PCT/GB2010/000885, filed on May 5, 2010, and from GB 0907781.9, filed May 6, 2009, all of which are hereby incorporated by reference herein in their entireties.

FIELD OF THE INVENTION

The present invention relates to a lifting device, and in particular to such a device for use in lifting sheets or panels, more particularly for lifting glazing panels.

STATE OF THE ART

Lifting devices including a suction mount arrangement enabling securing of the lifting device to a body to be lifted (for example a glazing panel) are known. Exemplary such lifting devices are disclosed for example in DE2013755 and in FIG. 5 of WO2007/039738. Devices include spaced sucker suction devices mounted to an interconnecting handle. Such devices are often referred to as 'telephone sucker' or 'telephone lifter' devices in view of their appearance resembling a telephone handset. Typically the suction devices include a lever having a cam which is movable to urge a cam follower to push down the concave dish of the flexible sucker body so energising or de-energising the suction device. The interconnecting handle provides a grip for the device to enable lifting of the relevant windscreen or the like.

Recently lifting and positioning assistance devices such as that disclosed in U.S. Pat. No. 7,216,411 have come into use, particularly for large glazing panels to be installed in vehicles. The device also includes a suction mount arrangement to secure a support tube 36 to the glazing panel. When using lifting assistance devices in concert with using traditional telephone sucker type lifting devices, it is difficult to maintain comfortable hand wrist and arm positions.

An improved and more versatile lifting device has now been developed.

SUMMARY OF THE INVENTION

According to the present invention, there is provided a lifting device comprising an elongate lifting arm having a suction mount arrangement enabling securing of the device to a body to be lifted, the suction mount arrangement comprising first and second suction devices spaced apart in the longitudinal direction of the lifting arm wherein the spacing between the first and second suction mount devices is sufficient for a user to grip the lifting arm in between the first and second suction mount devices; the device extending away from the suction mount arrangement, in the longitudinal direction of the lifting arm, to a handle portion spaced from the suction mount arrangement in the longitudinal direction, and extending upwardly above the lifting arm on the opposite side of the lifting arm to the suction mount devices.

It is preferred that the lifting arm portion extends away from the suction mount arrangement by a distance equal to or more than the spacing between the first and second suction mount devices. This provides a good length of lifting arm to enable versatile lifting practices to be utilised.

Beneficially, the spacing between the first and second suction mount devices is sufficient for a user to grip the device in between the first and second suction mount devices. Particularly, it is desirable that the spacing between the position of fixing the suction mounting devices to the lifting device is sufficient for a user to grip the device in between fixing positions.

It is preferred that the suction mount arrangement is mounted to the device by means of an adjustable and/or flexible fixing arrangement. In one embodiment this may be achieved by means of providing a tilting/pivoting fixing which enables the suction mount to be pivoted or tilted with respect to the elongate lifting arm.

In a preferred embodiment, the handle portion has a plurality of handle grip portions extending in different attitudes, angles or in different orientations. In such an embodiment a first handle portion preferably extends in a generally upward orientation and a second handle portion may preferably extend in a direction generally outwardly from the mounting portion of the device. Beneficially an angled, curve-form or bowed grip portion interconnects the first and second handle to form a closed handle ring. The arrangement provides a handle grip above the level of the mounting arm, in addition to the grip between the mounting suction devices. Such features provide ergonomic benefits and possibility of variety of potential use.

Beneficially, the suction mount arrangement is mounted with respect to the device to extend downwardly (i.e the suction mount arrangement is under-slung with respect to the lifting arm of the device).

The invention will now be further described in specific embodiments, by way of example only, and with reference to the accompanying drawings.

DETAILED DESCRIPTION OF THE PREFERRED EMBODIMENTS

Figure 1:
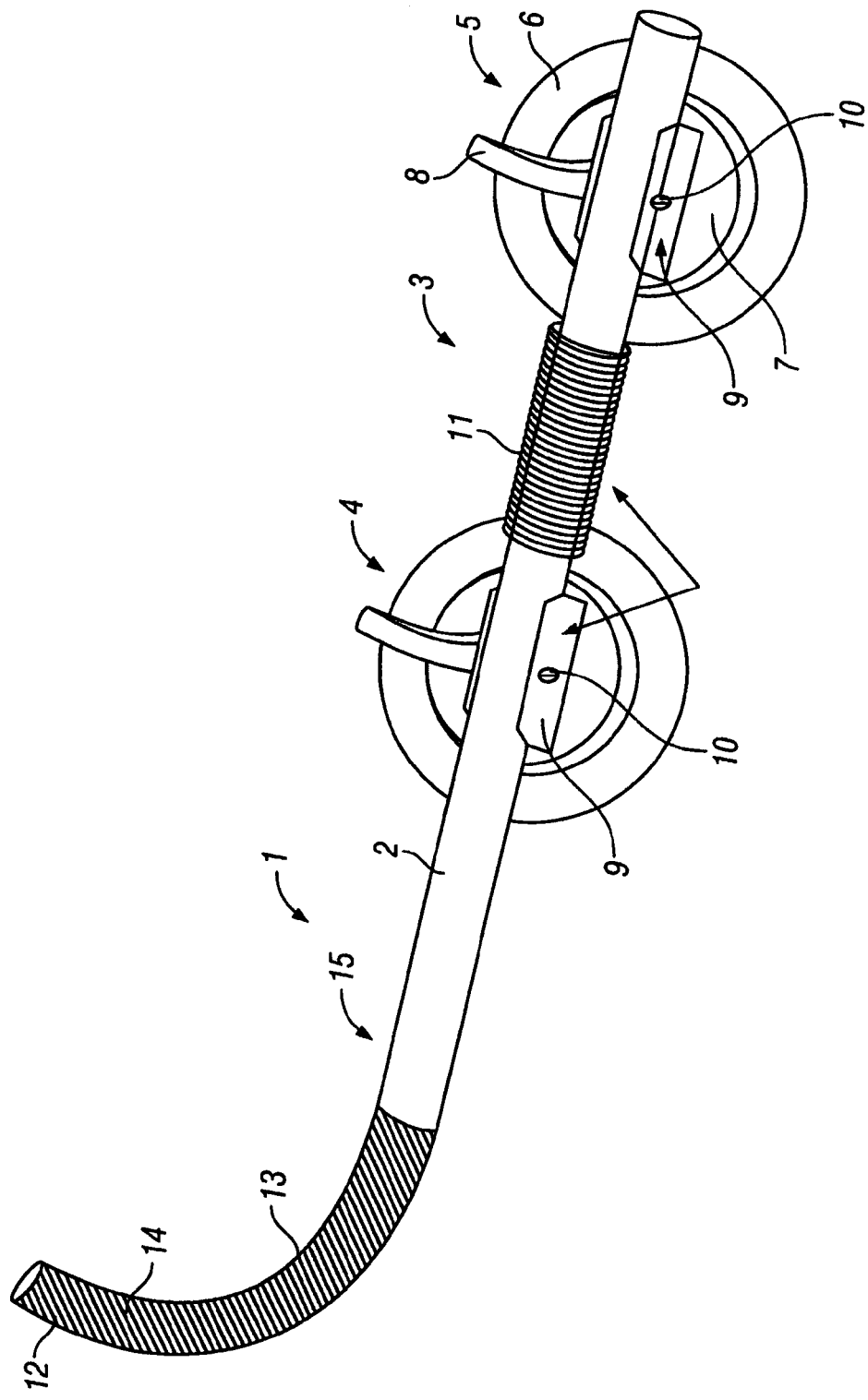
FIG. 1 is a perspective view of a first embodiment of lifting device in accordance with the invention.

Referring initially to FIG. 1, there is shown a lifting device 1 comprising an elongate tubular lifting arm 2 which has a mounting section 3 to which are mounted a pair of suction mount devices 4,5. The mounting devices may be generally in accordance with known prior art devices such as disclosed for example in DE20103755 and WO2007/039738 and may comprise a flexible rubber sucker 6 mounted to a hard plastic mounting shell 7. An actuation lever 8 is pivotally mounted to the mounting shell 7, the primary purpose of the actuation lever being to energise or de-energise the sucker when the lever is moved between an energised and a de-energised position. The suction mount device 4, 5 can in this way be placed on a surface (such as a glazing panel) and energised to form a reduced pressure suction engagement with the surface. This engagement is robust enough to enable the panel to be lifted with the suction mount device 4,5.

Each of the sucker mount devices 4,5 is mounted to the mounting section 3 of the lifting arm 2 by means of a pivotally secured mounting bracket 9 secured by a pivot pin 10 and permitting pivotal movement over a small range with respect to the mounting arm 2. This limited pivotal movement of the sucker mount devices 4,5 is sufficient to ensure good sealing contact on curved glazing panels (such as curved windshields).

The portion of the lifting arm extending between the mounting pivot pins 10 is provided with a plastics grip sheath 11. Distance between the mounting pins 10 is such that the user can easily grip the lifting arm in the mounting section between the suction mount devices 4,5.

Extending away from lifting arm 2 toward a distal end 12 of the device is a cantilever extension section 15 of the lifting arm 2. Typically the cantilever extension section 15 of the lever arm 2 extends away from the mounting section 3 by distance of equal or more to the length of the mounting section 3 (typically the extension section length is in the range 20 to 50 cm). Therefore a relatively long extension is provided extending away from the mounting section 3. Towards its distal end 12 the extension section 15 is provided with a curved-form handle portion 14 which curves upwardly with respect to the mounting section. The curved section 14 is provided with a plastics grip sheath 13. The curve form handle section 14 is of sufficient length and curvature to be gripped by a user in a variety of positions.

Figure 2:
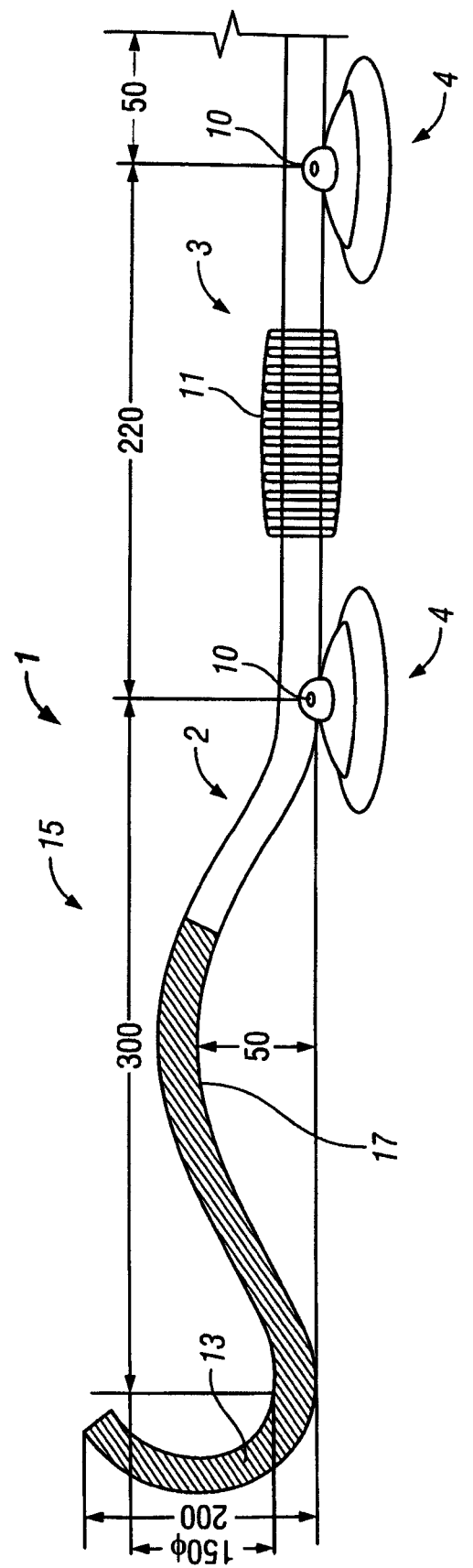
FIG. 2 is a view of a second embodiment of lifting device in accordance with the invention.

Referring now to the embodiment of FIG. 2, where like parts are identified with like reference numerals with respect to FIG. 1. The arrangement of FIG. 2 is generally identical to the arrangement of FIG. 1 in respect of the mounting section 3 and the under slung mounting of the suction mounting devices 4,5.

The extension section 15 of the lifting arm 2 also extends to an upwardly curved distal end handle 14. However in this instance, between the distal end handle 14 and the mounting section 3, the extension portion 15 of the lifting handle 2 is curved to a bow-form section 17 extending upwardly with respect to the mounting section 3. This bow-section 17 has in certain uses been found to provide ergonomic benefits. The extension section 15 extends from the mounting section 3 for approximately 30 cms whereas the distance between the mounting pins 10 of the suction mount devices 4,5 is approximately 22 cms. A device having these dimensions has been found to be suitable for ergonomic use in practice.

Figure 4:
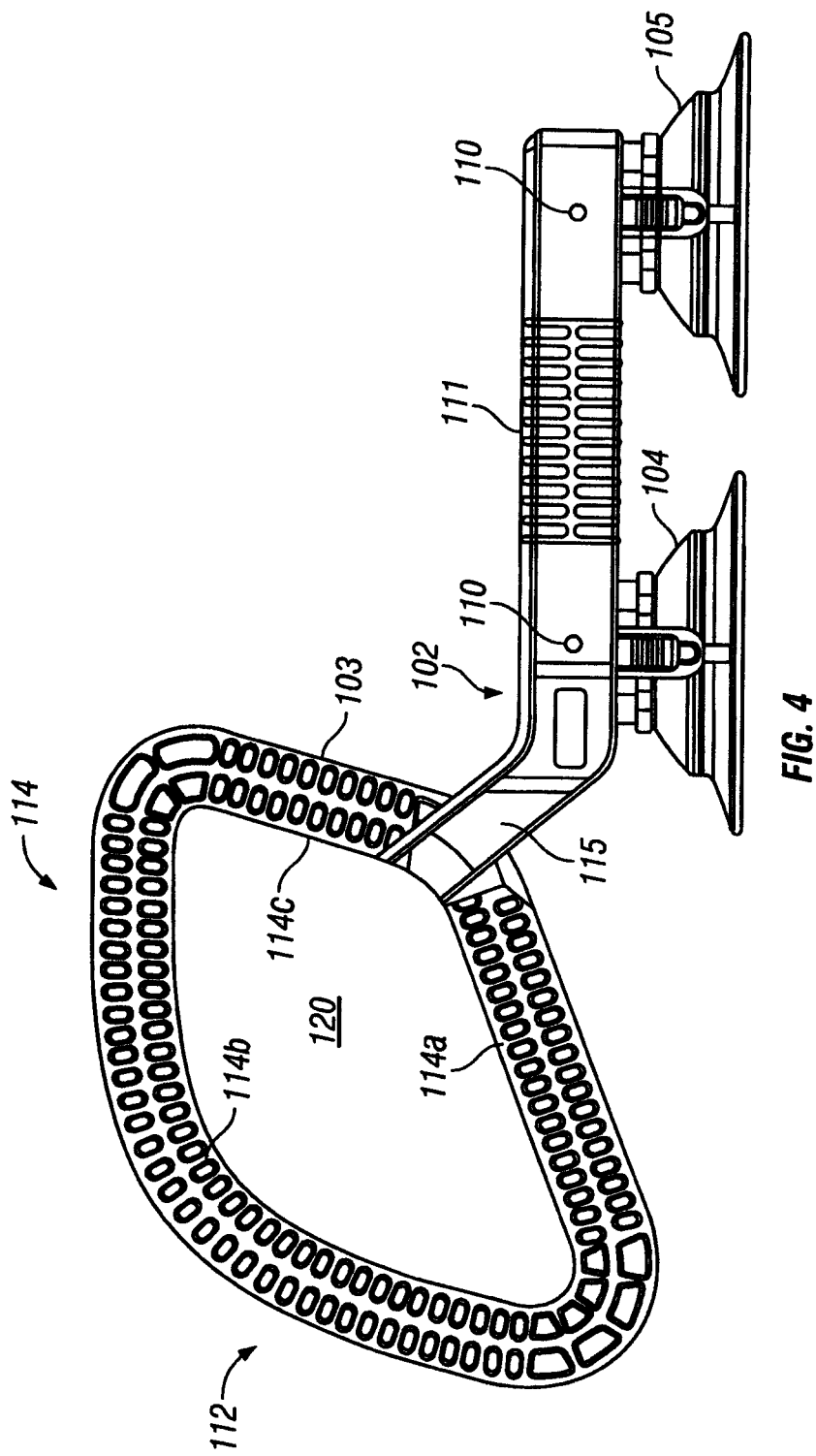
FIG. 4 is a side view of an alternative embodiment of lifting device in accordance with the present invention.
Figure 5:
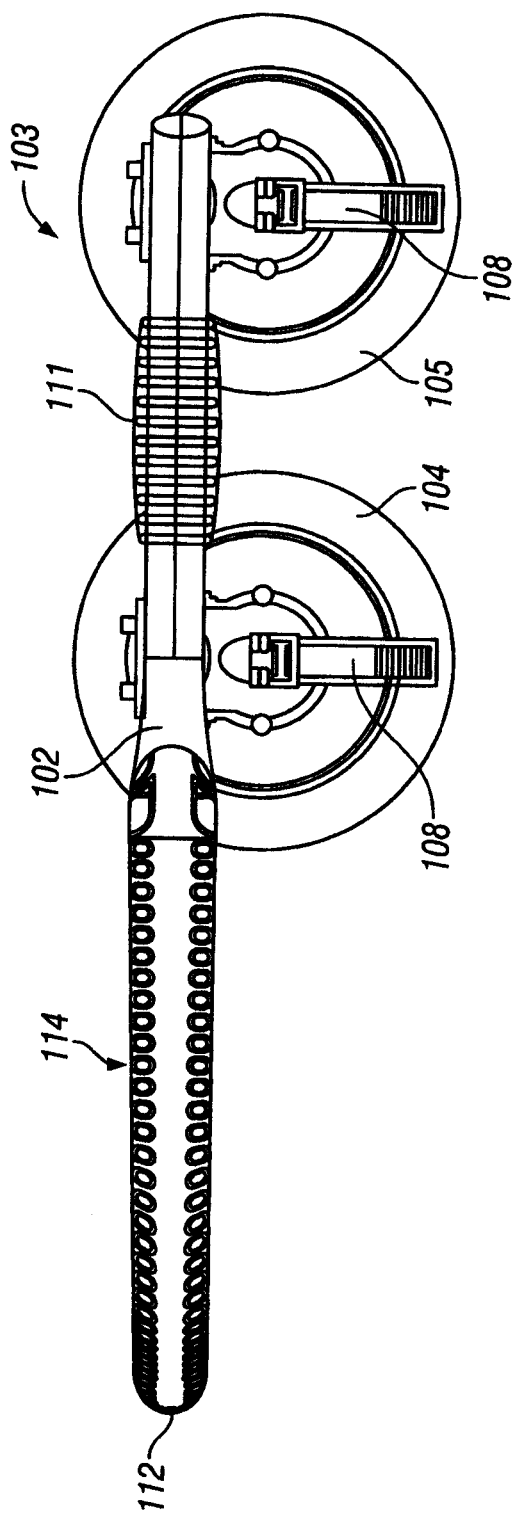
FIG. 5 is a plan view of the embodiment of FIG. 4.

An alternative embodiment of lifting device is shown in FIGS. 4 and 5. In the embodiment shown, the mounting section of the device is generally similar to the mounting section of the device shown in the previous embodiments. Each of the sucker mount devices 104, 105 is mounted to the mounting section 103 of the lifting arm 102 by means of a pivotally secured mounting bracket secured by a pivot pin 110 and permitting pivotal movement over a small range with respect to the mounting arm 102. This limited pivotal movement of the sucker mount devices 104, 105 is sufficient to ensure good sealing contact on curved glazing panels (such as curved windshields).

The portion of the lifting arm extending between the mounting pivot pins 110 is provided with a plastics grip sheath 111. Distance between the suction mount devices 104, 105 is such that the user can easily grip the lifting arm 102 in the mounting section between the suction mount devices 104,105. As can be seen from the plan view in FIG. 5, the longitudinal axis of the lifting arm 102 is offset from the axis of the sucker devices 104, 105 in order to accommodate the over-centre lever actuation mechanism 108 of the sucker devices 104, 105.

Extending away from mounting section 103 toward a distal end 112 of the device is a short extension section 115 of the lifting arm 102. The short extension section 115 is angled to extend upwardly in an upward direction on the opposite side of the lifting arm 102 to the suction devices 104, 105. The short extension 115 connects with a handle arrangement 114 which includes handle sections 114*a* 114*b* and 114*c* of differing orientations. Handle section 114*a* extends outwardly away from the mounting section and is inclined slightly downwardly (to the side of the device on which the suction mount devices are positioned). Handle section 114*c* extends upwardly away from the mounting section 103 and is inclined slightly toward the mounting section 103.

Handle section 114*b* is curved or angled to connect with spaced portions of the handle sections 114*a* and 114*c* to form a closed handle ring having a central opening zone 120. Handle sections 114*a* and 114*c* are preferably of a size (length) to be gripped by a hand of the user. Handle section 114*b* is at least long enough to be gripped by two hands of the user arranged side by side gripping the handle length. The differently orientated and positioned handle sections 114*a* 114*b* 114*c* 111 enable a number of different gripping possibilities and provide enhanced versatility of use options.

The distal end of the handle arrangement is spaced from the mounting section by a distance substantially corresponding to (or greater than) the spacing of the suction mount devices 104, 105. This provides an extension and handle length that is typically in the range 20 to 50 cm. Therefore a relatively long extension is provided extending away from the mounting section 103. The handle arrangement projects upwardly above the lifting arm on the opposite side of the lifting arm to the suction mount devices.

Figure 3A:
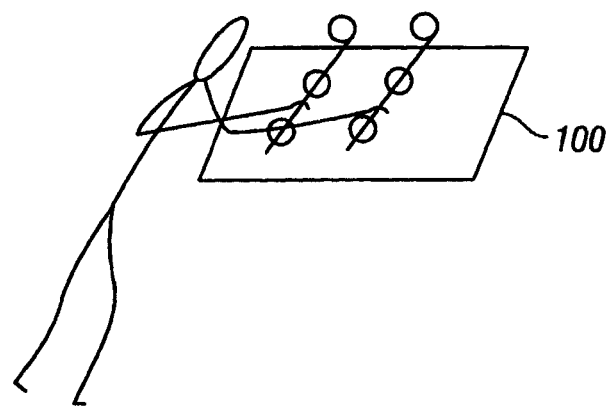
FIGS. 3a to 3c are schematic views of the lifting device of the present invention in use in various applications.

The lifting device has been found extremely versatile in terms of its applicability for different uses. As shown in FIG. 3*a*, a user can use a pair of devices gripped in the mounting section 3 to lift and place a glazing panel such as a windshield in the same manner as telephone sucker devices as known in the prior art have previously been used. In such lifting applications the extension section 15 and upwardly extending handle 14 is not used and is directed away from the user.

Figure 3B:
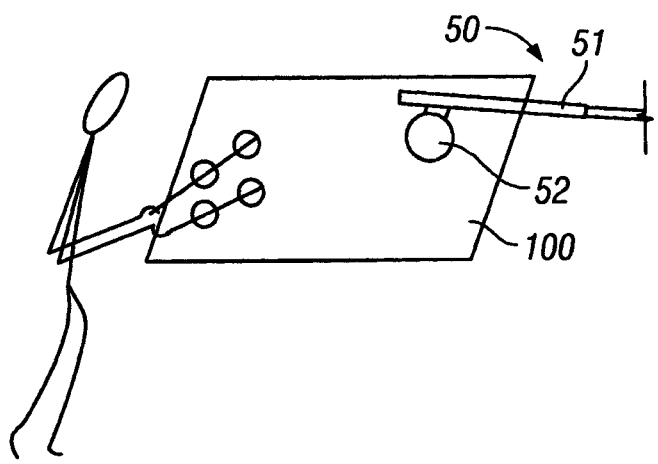

Additionally, the lifting device of the present invention can be used for glazing panel installations using a lifting assistance device such as for example disclosed in U.S. Pat. No. 7,216,411. Such an application is shown in FIG. 3*b* in which the assistance device 50 comprises a pivoted arm 51 having a sucker mount 52 which is secured by suction to the windshield 100. The user may use the device 1 of the present invention as a pair with one held in each hand and in this instance, because the windshield is relatively large (necessitating the use of the assistance device 50) the user may grip the handle 114 of the device by the upwardly curved distal end handle section 14*b*. The curved handle portions 114*b* are positioned such that they extend beyond the periphery of the glazing panel. The installer is then able to find the most comfortable position for their hands on the curved part of the handle. This enables the arms to remain tucked in at the side of the user, which provides the safest and the easiest position for lifting. Having his hands positioned outside the periphery of the glazing panel allows the installer to manoeuvre the glazing panel by pushing from below rather than from pulling from above so that they can more comfortably and safely work on taller vehicles. Also the extension that the device provides by virtue of the extension section and handle 114 extending away from the mounting section 113 provides more convenient and safer means for movement of the glazing panels around higher vehicles with longer bonnets.

Figure 3C:
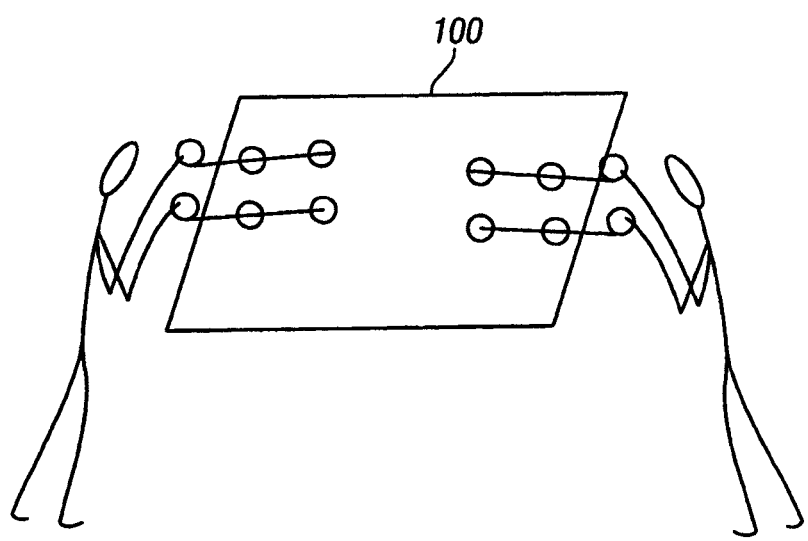

The device of the present invention may also be used for two person installations as shown in FIG. 3*c*, particularly for large glazing panels. Each installer has one pair of lifting devices which are positioned one towards the top and one towards the bottom of the glazing panel. The distal end handles 114 extend outwardly beyond the periphery of the glazing panel 100.

Each installer is able to find the most comfortable handle section position 114a 114b 114c on the distal end handle 114. In this context the provision of the bowed section 17 of the embodiment FIG. 2 has been found to provide benefits. The ability to grip the handle sections 114b and 114c positioned above the level of the lifting arm 102 sucker mount devices is particularly useful in certain circumstances.

Because the handle portions 114 are positioned outwardly of the periphery of the glazing panel, the installers can comfortably use both hands and push from below with a neutral wrist position rather than pull from above where the wrist will inevitably become bent which is less favourable from a safety and ergonomic point of view. An additional benefit of being able to use the handle extension is that the user will generally have a better view for positioning the glass allowing careful laying in of both top and bottom edges.

The device provides a useful and versatile lifting tool for use individually, in pairs or in combination with other devices.

The invention claimed is:

1. A device operable by a user to lift a body, the device comprising:
   an elongate lifting arm extending in a longitudinal direction, wherein a section of the lifting arm has a suction mount arrangement enabling securing of the device to the body, wherein said suction mount arrangement includes first and second suction devices spaced apart from one another in the longitudinal direction, wherein the spacing between the first and second suction devices is sufficient for the user to grip the lifting arm in between the first and second suction devices;
   an upwardly curved handle portion spaced from the suction mount arrangement in the longitudinal direction; and
   an upwardly angled cantilever extension section that extends between an end of the elongate lifting arm and the curved handle portion;
   wherein the handle portion extends upwardly above the section of the lifting arm of the suction mount arrangement and has a plurality of handle grip portions extending in different orientations relative to the longitudinal direction.

2. A device according to claim 1, wherein:
the handle portion extends from the lifting arm opposite the section of the lifting arm of the suction mount arrangement.

3. A device according to claim 1, wherein:
the handle portion extends away from the section of the lifting arm of the suction mount arrangement by a distance substantially equal to, or more than, the spacing between the first and second suction devices.

4. A device according to claim 1, wherein:
the plurality of handle grip portions includes a first handle grip portion and a second handle grip portion, wherein the first handle grip portion extends in a generally upward orientation, and the second handle grip portion extends in a direction generally away from the section of the lifting arm of the suction mount arrangement.

5. A device according to claim 4, wherein:
the plurality of handle grip portions further includes an angled or bowed handle grip portion that interconnects the first and second handle grip portions to form a closed handle ring.

6. A device according to claim 4, wherein:
said closed handle ring is spaced apart from the section of the lifting arm of the suction mount arrangement in the longitudinal direction.

7. A device according to claim 1, wherein:
the suction mount arrangement is mounted to the device by means of an adjustable fixing arrangement.

8. A device according to claim 7, wherein:
the adjustable fixing arrangement enables a respective suction device to be pivoted or tilted with respect to said lifting arm.

9. A device according to claim 1, wherein:
the handle portion is positioned proximate an end of the lifting arm spaced from the section of the lifting arm of the suction mount arrangement.

10. A device according to claim 1, wherein:
the suction mount arrangement is operably disposed below the lifting arm.

11. A device according to claim 1, wherein:
the section of the lifting arm of the suction mount arrangement includes a grip handle disposed between the first and second suction devices.

12. A device according to claim 1, wherein:
at least one handle grip portion extends upwardly from the cantilever extension section.

13. A device according to claim 12, wherein:
another handle grip portion extends downwardly from the cantilever extension section.

14. A device according to claim 13, wherein:
said plurality of hand grip portions define a closed handle ring spaced apart from the section of the lifting arm of the suction mount arrangement in the longitudinal direction.

* * * * *